(12) United States Patent
Shah et al.

(10) Patent No.: US 8,532,638 B2
(45) Date of Patent: *Sep. 10, 2013

(54) METHOD AND SYSTEM FOR MAINTAINING TEXTSITES ON A GLOBAL TEXTSITE PLATFORM

(75) Inventors: Manish R. Shah, Mountain View, CA (US); Clinton Nielsen, Saint Albert (CA); Scott D. Cook, Woodside, CA (US)

(73) Assignee: Intuit Inc., Mountain View, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 12/728,165

(22) Filed: Mar. 19, 2010

(65) Prior Publication Data

US 2011/0230213 A1 Sep. 22, 2011

(51) Int. Cl.
*H04L 29/08* (2006.01)
(52) U.S. Cl.
USPC .................. 455/414.4; 455/414.1; 455/414.2; 455/414.3; 455/466
(58) Field of Classification Search
USPC .................................. 455/414.1–414.4, 466
See application file for complete search history.

(56) References Cited

U.S. PATENT DOCUMENTS

| | | | |
|---|---|---|---|
| 6,016,509 A * | 1/2000 | Dedrick | 709/224 |
| 2004/0044576 A1* | 3/2004 | Kurihara et al. | 705/14 |
| 2006/0166686 A1 | 7/2006 | Kim | |
| 2006/0194572 A1* | 8/2006 | Fresonke et al. | 455/414.1 |
| 2007/0073669 A1* | 3/2007 | Kraft | 707/4 |
| 2007/0293247 A1* | 12/2007 | Bhat et al. | 455/466 |
| 2008/0046315 A1* | 2/2008 | Axe et al. | 705/14 |
| 2008/0228479 A1* | 9/2008 | Prado | 704/235 |
| 2008/0248821 A1 | 10/2008 | Kim | |
| 2009/0094525 A1* | 4/2009 | Coelius et al. | 715/741 |
| 2009/0106105 A1* | 4/2009 | Lewis et al. | 705/14 |
| 2009/0150405 A1* | 6/2009 | Grouf et al. | 707/10 |
| 2009/0322652 A1* | 12/2009 | Adderton et al. | 345/2.3 |
| 2010/0017280 A1* | 1/2010 | Davis et al. | 705/14.4 |
| 2010/0029309 A1 | 2/2010 | Maguire | |
| 2010/0062745 A1* | 3/2010 | Silk | 455/411 |
| 2010/0082435 A1* | 4/2010 | Hartman | 705/14.55 |
| 2010/0100945 A1* | 4/2010 | Ozzie et al. | 726/5 |
| 2010/0174825 A1* | 7/2010 | Wu et al. | 709/231 |
| 2010/0216494 A1* | 8/2010 | Abdel-Moiti Moik | 455/466 |
| 2011/0087547 A1* | 4/2011 | Amaro et al. | 705/14.53 |
| 2011/0125594 A1* | 5/2011 | Brown et al. | 705/14.73 |
| 2011/0244882 A1* | 10/2011 | Hancock | 455/456.1 |

OTHER PUBLICATIONS

PCT International Search Report and Written Opinion issued for Application No. PCT/US2010/042300, dated Mar. 29, 2011, 15 pages.
4INFO SMS Mobile Media, "Publishing and Mobile Marketing", http://advertising.4info.com/publishers, Dec. 4, 2009, 2 pages.

* cited by examiner

*Primary Examiner* — Lester Kincaid
*Assistant Examiner* — Mehmood B Khan
(74) *Attorney, Agent, or Firm* — Osha Liang LLP

(57) ABSTRACT

A method for accessing content using a global textsite platform including registering a unique keyword received from a publisher, receiving content from the publisher for creating a textsite associated with the unique keyword, creating the textsite on behalf of the publisher, receiving, from a user, a request to access the textsite, processing the request from the user, and providing access to the textsite by sending the content of the textsite, via a text messaging service (TMS), to a user mobile device.

49 Claims, 14 Drawing Sheets

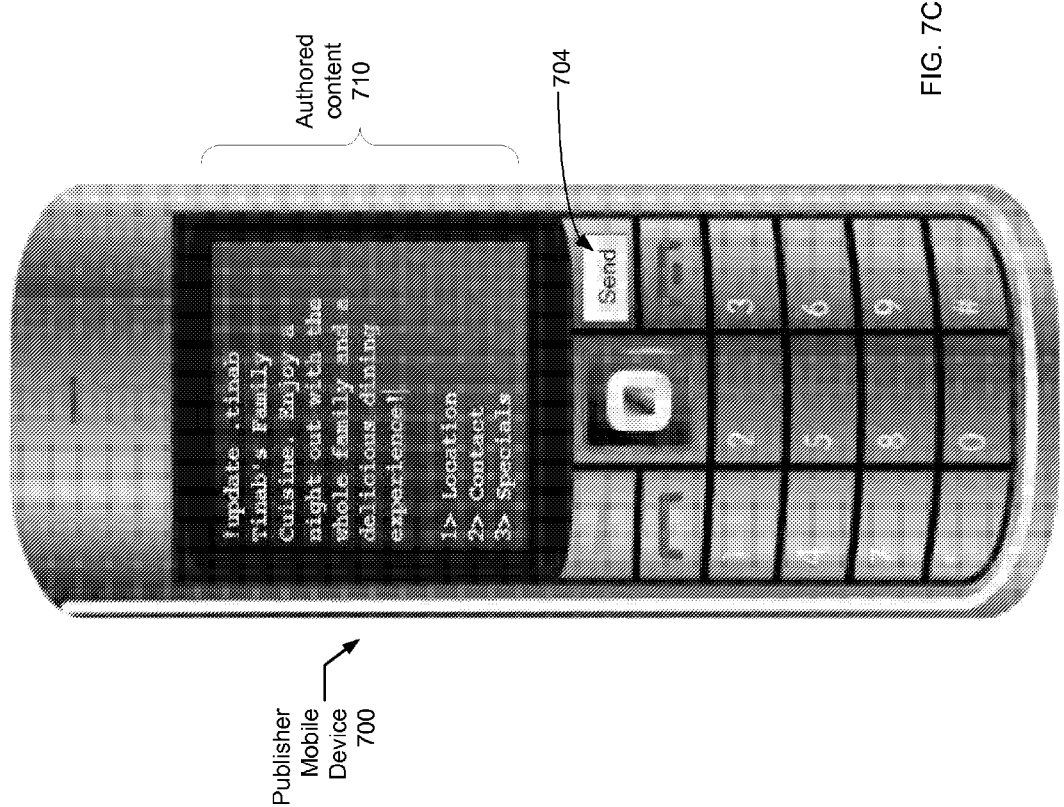

METHOD AND SYSTEM FOR MAINTAINING TEXTSITES ON A GLOBAL TEXTSITE PLATFORM

CROSS REFERENCE TO RELATED APPLICATIONS

This application is related to co-pending U.S. patent application Ser. No. 12/728,169, filed on Mar. 19, 2010, and entitled "ACCESSING TEXT SITES USING TEXT MESSAGING SERVICE," also assigned to the assignee of the present application, the subject matter of which is incorporated by reference herein.

BACKGROUND

Today's mobile devices, such as smart phones, allow users to browse the Internet from any location to obtain information on demand. As long as a user is in an area with the proper telecommunication network and subscribes to a data plan, the user is provided with access to the Internet for web browsing to obtain information such as phone numbers for service provides, map out a particular destination location, and obtain information relevant to the user's current or next activity. However, there are often instances in which a user wishes to access only limited information for a quick answer to a question (e.g., what are the next available show times for a particular movie?). In this scenario, browsing the website for the movie theater or a service provider website that provides movie show times, such as Fandango, may be cumbersome on the mobile device. Specifically, loading all the graphics and advertisements associated with websites on a mobile device can take additional time. Alternatively, the entire website may provide too much data to navigate through when a user desires only a specific piece of information. In addition, for mobile device users who do not subscribe to a data plan for browsing the Internet, are in an area without the proper telecommunication network, or do not have browsing capability on their mobile device, accessing such information on demand is not possible.

One solution to the aforementioned problem is for content publishers to provide information to users on mobile devices via text messaging, such as using Short Messaging Service (SMS), Multimedia Messaging Service (MMS), etc. Due to the growth and penetration of SMS capable mobile devices, the content publishers and service providers have attempted to enable access to its content and products via SMS. To facilitate providing content via SMS, each content publisher and/or service provider is required to secure its own SMS codes per country or per geographic region. For example, Google™ has reserved codes 466453 for the United States and 9773300000 for India. Similarly, Facebook® has reserved code 32665 for the United States and code 9232232665 for India (Facebook® is a registered trademark of Facebook Inc., located in Palo Alto, Calif.). Once a local mobile code is provisioned by a local operator of that particular geographic region, a custom adapter is required to be developed to integrate with local operator APIs for sending and receiving SMS. Accordingly, the publisher must create such an adapter. The need for such an adapter often makes offering a company's content via SMS from multiple countries to mobile device users a barrier for a typical web content publisher or web-based service provider.

SUMMARY

In general, in one aspect, the invention relates to a method for accessing content using a global textsite platform comprising registering a unique keyword received from a publisher, receiving content from the publisher for creating a textsite associated with the unique keyword, creating the textsite on behalf of the publisher, receiving, from a user, a request to access the textsite, processing the request from the user, and providing access to the textsite by sending the content of the textsite, via a text messaging service (TMS), to a user mobile device.

In general, in one aspect, the invention relates to a method for publishing content using a global textsite platform, comprising registering, by a publisher, a unique keyword with the global textsite platform, authoring content associated with the registered unique keyword using publishing tools provided by the global textsite platform, wherein the publisher registers the unique keyword and authors content by communicating with the global textsite platform using a text messaging service (TMS), and obtaining a textsite associated with the registered unique keyword and provided by the global textsite platform, wherein the textsite comprises the authored content.

In general, in one aspect, the invention relates to a method for accessing content hosted by a global textsite platform by a user using a user mobile device, comprising obtaining a registered unique keyword associated with a desired textsite, sending, via a text messaging service (TMS) using the user mobile device, a text message comprising the registered unique keyword to the global textsite platform, and receiving a text message response, via the TMS, comprising a homepage of the textsite.

In general, in one aspect, the invention relates to a computer readable storage medium comprising software instructions for providing access to content hosted by a global textsite platform, that when executed, comprise functionality to register a unique keyword received from a publisher, receive content from the publisher for creating a textsite associated with the unique keyword, create the textsite on behalf of the publisher, receive, from a user, a request to access the textsite, process the request from the user, and provide access to the textsite by sending the content of the textsite, via a text messaging service (TMS), to a user mobile device.

In general, in one aspect, the invention relates to a system for providing content, comprising a repository configured to store a plurality of registered unique keywords, and a plurality of publishing tools, wherein the plurality of publishing tools are used by a publisher to author content for at least one of a plurality of textsites hosted by a global textsite platform, an agent located within the global textsite platform and configured to receive a request to access a textsite of the plurality of textsites from a user mobile device, and send a response comprising the content of the textsite to the user mobile device via a text messaging service (TMS), and a server comprising a processor and configured to host the plurality of textsites.

Other aspects of the invention will be apparent from the following description and the appended claims.

DETAILED DESCRIPTION

Figure 1:
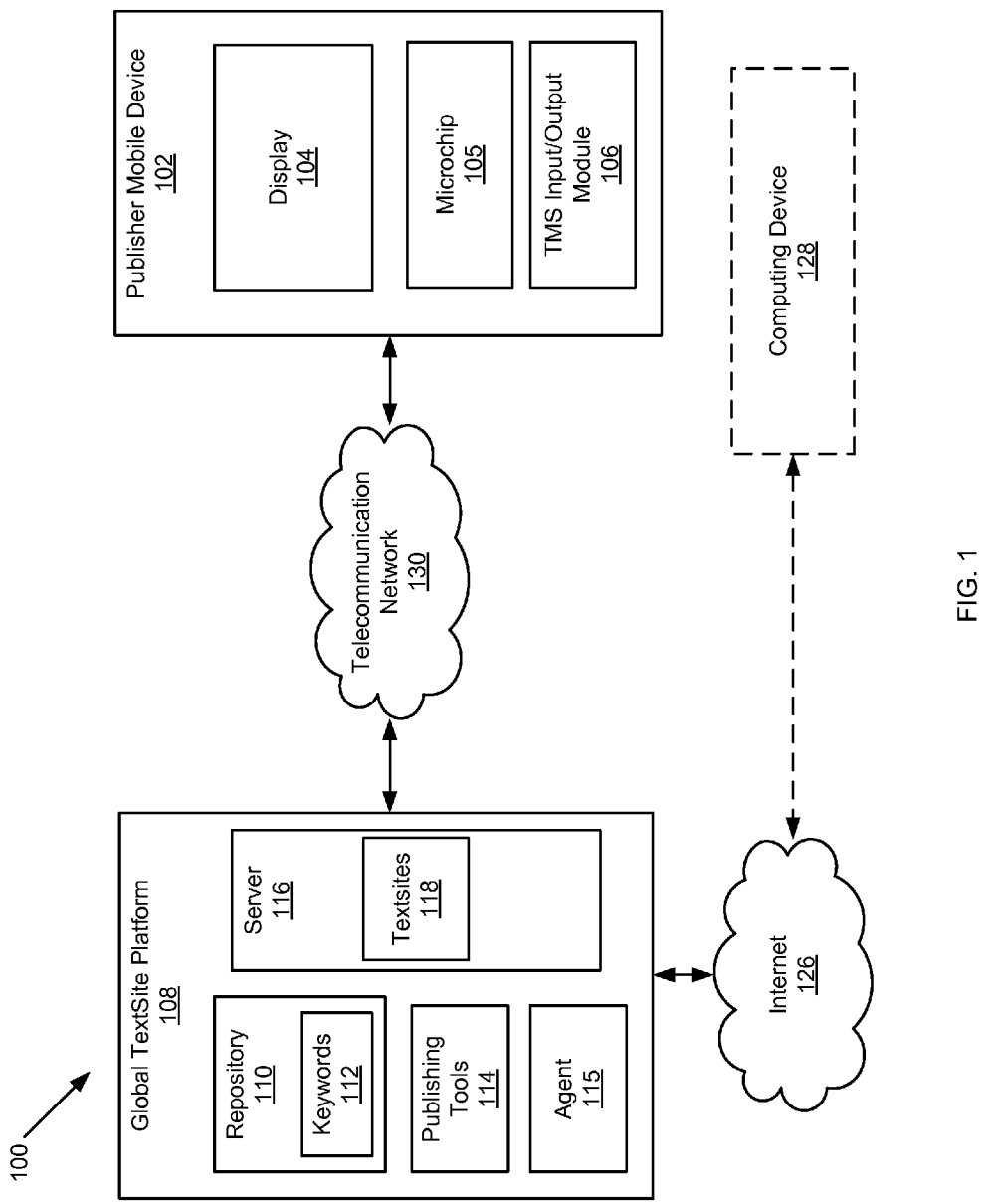
FIG. 1 shows a system flow diagram from the perspective of a publisher in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for providing access to content via a text messaging service. Specifically, access to publish content and access to browse the published content is provided by a global textsite platform that is globally accessible by publishers and users in a variety of geographic locations. Embodiments of the invention also provide a method and system for a global textsite platform that may be used by existing web publishers and new publishers to easily publish content that is accessible by any mobile user of text messaging services throughout the world.

FIG. 1 shows a flow diagram of a system (100) for publishing content by a publisher in accordance with one or more embodiments of the invention. Specifically, FIG. 1 shows a publisher mobile device (102), a telecommunication network (130), and a global textsite platform (108). Each of the aforementioned components of the publisher system is described below.

Generally, a publisher may be any person or entity that wishes for users to have access to information/content via a text messaging service. More specifically, a publisher may be any developer or service provider that provides a service or a product for users. For example, a publisher may be a restaurant owner that creates a textsite to provide information about his/her restaurant. A publisher may possess, in one or more embodiments of the invention, a publisher mobile device (102). In one or more embodiments of the invention, the publisher may optionally possess a computing device (128), such as a desktop computer, a laptop computer, a thin computer, a mobile device associated with a data plan subscription (e.g., a smart phone, a tablet, a pad device, a gaming device a personal digital assistant, etc.), a combination thereof, or any other suitable electronic computing device that is capable of connecting to the global textsite platform (108) via the Internet (126). The computing device (128) may provide greater functionality to interact with the global textsite platform (108) than the publisher mobile device (102). Accordingly, the interaction with the global textsite platform (108) may be accomplished using a network (such as the Internet (126)), rather than a telecommunication network (130). In one or more embodiments of the invention, the computing device (128) includes functionality such as the computing device (1100) shown in FIG. 11 and described below.

The publisher mobile device (102) may be any mobile device, such as a Code Division Multiple Access (CDMA) device, a global system mobile (GSM) device, a 3G device, a 4G device, or any other suitable mobile device that includes text messaging functionality. The publisher mobile device (102) includes a display (104), a microchip (105), and a text messaging service (TMS) input/output module (106). In one or more embodiments of the invention, the publisher mobile device (102) is operatively connected to a global textsite platform (108) via a telecommunication network (130). The telecommunication network (130) may be any network that facilitates the exchange of messages from one part of the network to another. For example, the telecommunication network (130) may be a wide area network, a local area network, a public switched telephone network (PSTN), or any other suitable network for exchanging messages between the global textsite platform (108) and the publisher mobile device (102).

The display (104) of the publisher mobile device (102) may be a display screen using technology such as liquid crystal display (LCD), a light emitting diode (LED), organic light emitting diode (OLED), or any other suitable type of display screen capable of displaying the content of received text messages and the content of a text message that is being composed on the publisher mobile device (104). The microchip (105) may be any tangible hardware processor(s) or microprocessor(s) for executing the functionalities of the publisher mobile device (102). More specifically, the microchip (105) executes the software application(s) that provide functionalities such as browsing, text messaging, maintaining a contact list and making phone calls, etc. The TMS input/output module (106) may be a virtual keyboard, a physical keyboard, or any other input/output device(s) or button(s) that allows the publisher to compose text messages and receive and read text message responses.

Continuing with FIG. 1, the global textsite platform (108) is a framework for providing publishers with publishing tools for authoring content that is accessible via a text messaging service (TMS). The TMS may be, for example, an SMS, an MMS, or any other text messaging service which is now known or later developed. In one or more embodiments of the invention, a textsite is one or more pages of content that is made globally accessible via a TMS. Similar to websites known today, which are made globally accessible via the Internet, a textsite includes a homepage and one or more text pages that are hierarchically and/or organizationally linked to the homepage for browsing information contained on one or more text pages of the textsite.

Figure 11:
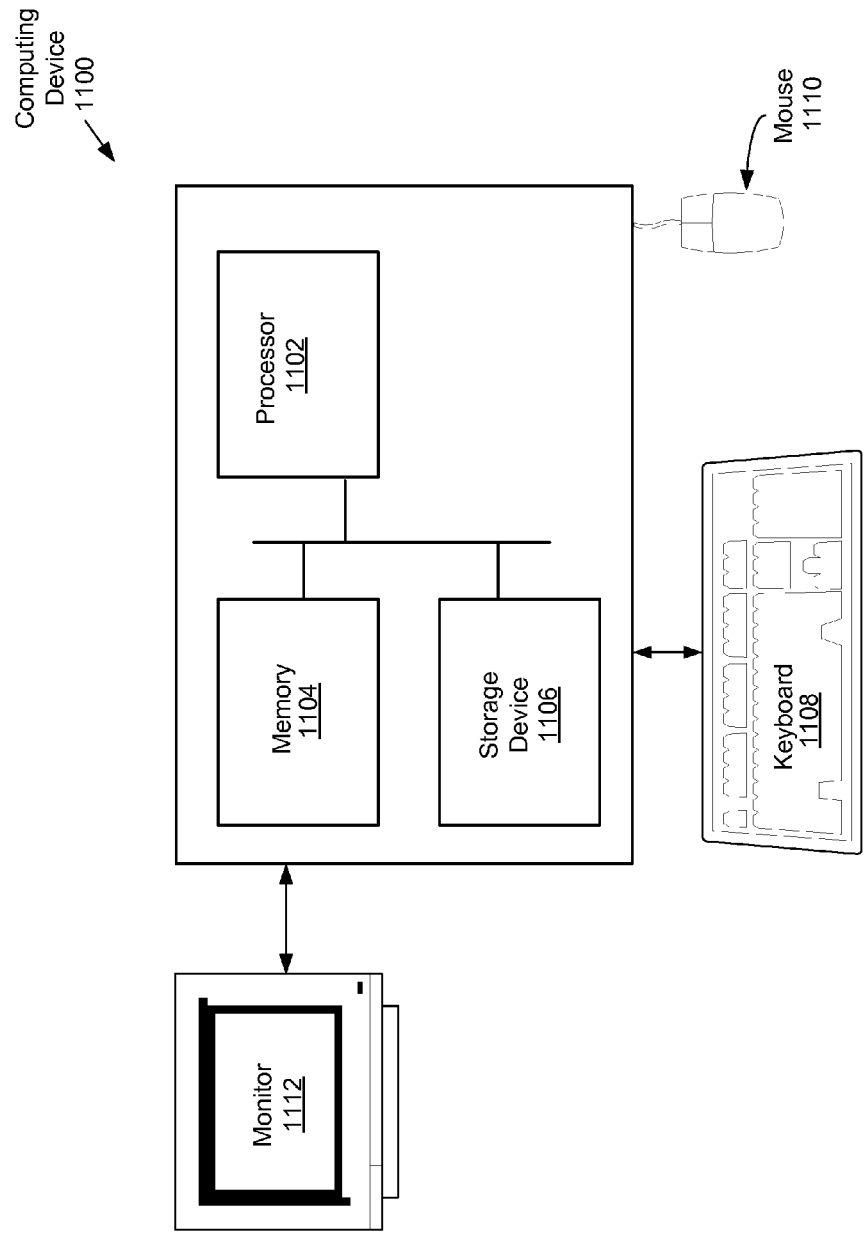
FIG. 11 shows a flow diagram of a computer system in accordance with one or more embodiments of the invention.

In one or more embodiments of the invention, the global textsite platform (108) executes on one or more computing device(s) (e.g., a server, a computer system as shown in FIG. 11 and described below, etc.) and may be hosted by an entity, such as a corporation. In one or more embodiments of the invention, the global textsite platform (108) is associated with a platform syntax that is specific to the global textsite platform (108) and that facilitates communication via a TMS. For example, text messages exchanged with the global textsite platform may require less than a predetermined number of characters (e.g., less than 160 characters) and may begin and end with particular reserved keywords. Examples of reserved keywords include, but are not limited to, "new", "delete", "register", "update", "location", etc. In addition, reserved keyword may include specific punctuation or combinations of punctuation marks such as "." for navigating backward and "!" for a new request directed to the global textsite platform to perform some action. Further, in one or more embodiments of the invention, the global textsite platform (108) may be associated with different unique phone numbers or codes corresponding to each different geographic locations. Alternatively, a single, unique global number/code may be associated with the global textsite platform (108).

In one or more embodiments of the invention, the global textsite platform (108) includes numerous components including a repository (110), a server (118), publishing tools (114), and an agent (115). Each component is described below in related to FIG. 1 except for the agent (115), which is described with respect to FIG. 2.

The repository (110) is configured with functionality to store keywords (112). The repository may be any datastore (flat file, hierarchical file, relational database, enterprise-wide database, etc.) capable of storing data, regardless where or in what form the data originates. Keywords (112) may be reserved or pre-designated keywords maintained by the platform as part of the platform syntax, and publisher keywords that are registered by publishers for each textsite authored by a publisher. In one or more embodiments of the invention, pre-designated keywords and publisher registered keywords are unique. That is, no two keywords from the group of keywords that are pre-designated as platform syntax or the group of keywords provided by a publisher, are allowed to be identical. In fact, in one or more embodiments of the invention, the keywords (114) are closely controlled by the global textsite platform in an effort to eliminate duplicates. Navigating keywords, which a publisher defines for a textsite that is associated with a unique registered keyword, are also used. Navigating keywords are not required to be unique. For example, two distinct publishers with distinct registered keywords representing a first and a second textsite may use the same navigating keyword for different text pages associated with the first and second textsites.

In one or more embodiments of the invention, the global textsite platform (108) is configured with functionality to receive a unique keyword from a publisher and create a textsite (118) on behalf of the publisher. Further, the global textsite platform (108) is configured with functionality to receive content authored by the publisher using the publishing tools (114) provided by the global textsite platform (108). In one or more embodiments of the invention, publishing tools (114) may include any software or hardware tool that aids a publisher in authoring content for a textsite to the global textsite platform (108). Publishing tools (114) may be maintained by the global textsite platform (108). For example, in one or more embodiments of the invention, publishing tools (114) may include, but are not limited to, a registration service that registers unique keywords for each textsite, a text messaging protocol for sending and receiving text messages via a TMS, a page status tool for displaying the number of visits a particular publisher textsite has received, a tool for printing a flyer to advertise a registered keyword associated with a created textsite, a tool for integrating content from third-party websites with a created textsite, or any other suitable tool for authoring content for a textsite. The text messaging protocol, for example, may be a protocol that specifies syntax and semantics for exchanging messages via a TMS with the global textsite platform (108).

The global textsite platform (108) also includes a server (116) configured to host the plurality of textsites (118) created and maintained by the global textsite platform (108) on behalf of publishers. Those skilled in the art will appreciate that the server (116) may be any computing device with a large storage capacity for hosting the plurality of textsites (118).

Figure 2:
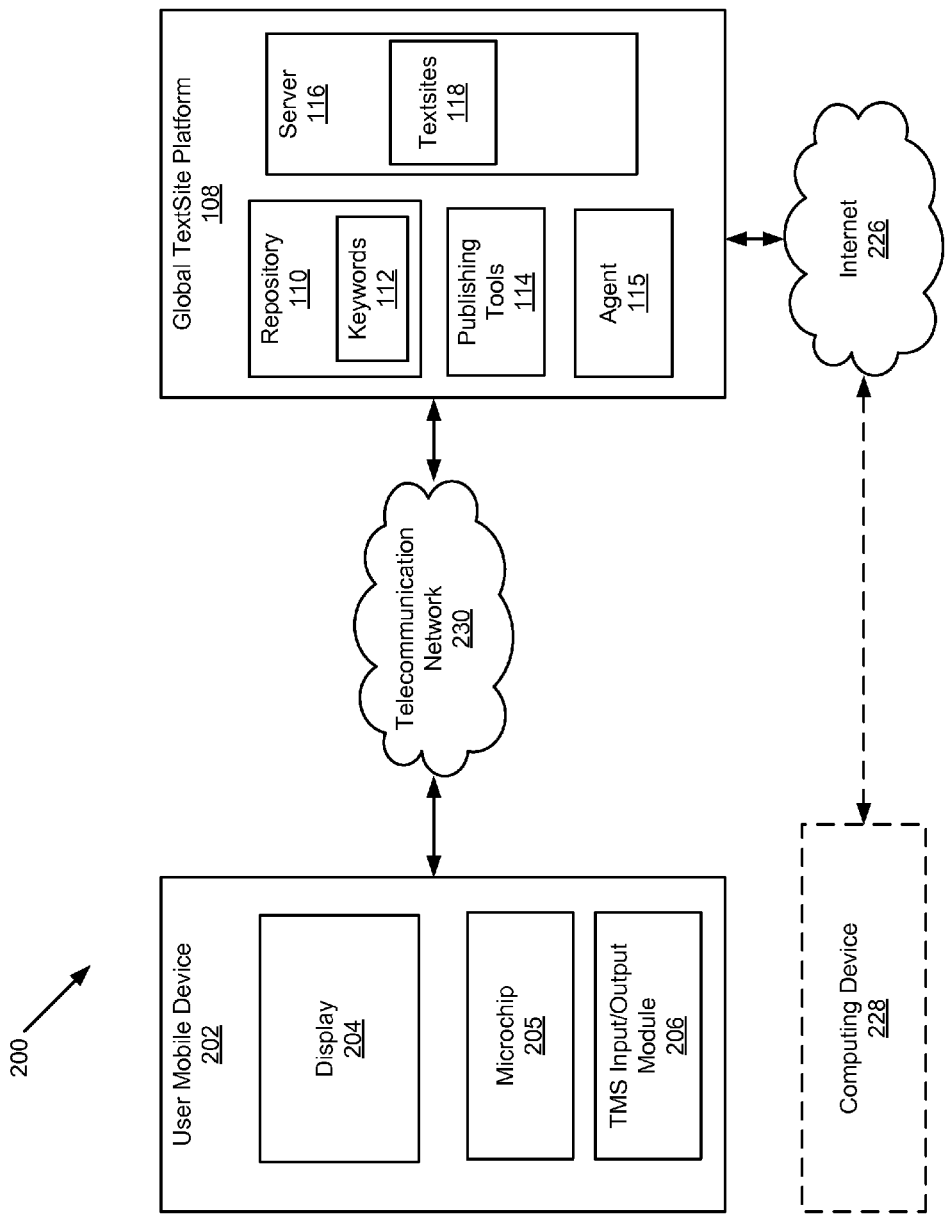
FIG. 2 shows a system flow diagram from the perspective of a user in accordance with one or more embodiments of the invention.

FIG. 2 shows a flow diagram of a system (200) for accessing content from a user's perspective in accordance with one or more embodiments of the invention. Specifically, FIG. 2 shows the global textsite platform (108) of FIG. 1 and a user mobile device (202).

In one or more embodiments of the invention, the user mobile device (202) is operatively connected to the global textsite platform (108) via a telecommunication network (230). The global textsite platform (108) includes a repository (110) for storing keywords (112), publishing tools (114), a server (116) configured to host a plurality of textsites (118), and an agent (115). The user mobile device (202) includes a display (204), a microchip (205), and a TMS input/output module (206). Those skilled in the art will appreciate that the aforementioned global textsite platform (108) components and user mobile device (202) components are capable of the same functionality described above with respect to FIG. 1, one difference being that the components of the user mobile device (202) include functionality to execute software, display text messages, and take TMS input from a user and output TMS responses to the user browsing a textsite rather than a publisher.

In one or more embodiments of the invention, a user is defined as a person or entity accessing content published by publishers and hosted by the global textsite platform (108). In one or more embodiments of the invention, a user is a person or entity with a mobile device that does not have a data plan subscription. Rather, the user is able to obtain data using the mobile device only via a TMS. That is, embodiments of the invention pertain specifically to users accessing content only via a TMS. Those skilled in the art will appreciate, however, that although embodiments of the invention target users that communicate via a TMS, the invention is not limited to such users. Specifically, while embodiments of the invention are directed to providing access to textsites to users using a mobile phone via a TMS, some users may exist that have the capability to access content on the global textsite platform (108) via a computing device (228) that is connected to the Internet (226). For example, in one or more embodiments, a user may use a text message emulator executing on the computing device (228) to connect to the global textsite platform (108) via the Internet (226). Alternatively, users with smart phones and/or mobile devices that support Internet browsing functionality could access content on the global textsite platform (108) using the Internet (226).

In the user system (200) of FIG. 2, the global textsite platform (108) is configured to receive a text message from the user mobile device (202) that includes a request to access a textsite hosted by the global textsite platform (108). Further, the global textsite platform (108) is configured to process the request received from the user mobile device (202), and to provide the content from the desired textsite to the user's mobile device (202) via a TMS.

To facilitate this interaction with a user mobile device (202), the global textsite platform (108) includes an agent (115). In one or more embodiments of the invention, the agent (115) may be software that is the component of the global textsite platform (108), which communicates with a user mobile device (202). Specifically, the agent (115) is configured with functionality to receive a text message from a user mobile device (202), parse the text message for the relevant keywords or platform-specific syntax, and respond to the user request with the content from the requested textsite back to the user mobile device (202) in accordance with one or more embodiments of the invention. In one or more embodiments of the invention, when a textsite integrates content from a third-party website, the agent (115) is further configured with functionality to forward the relevant information from a user request to the third-party website, receive and process a response to the user request from the third-party website, and forward the response or the content of the response from the third-party website directly to the user's mobile phone via a TMS.

Figure 3:
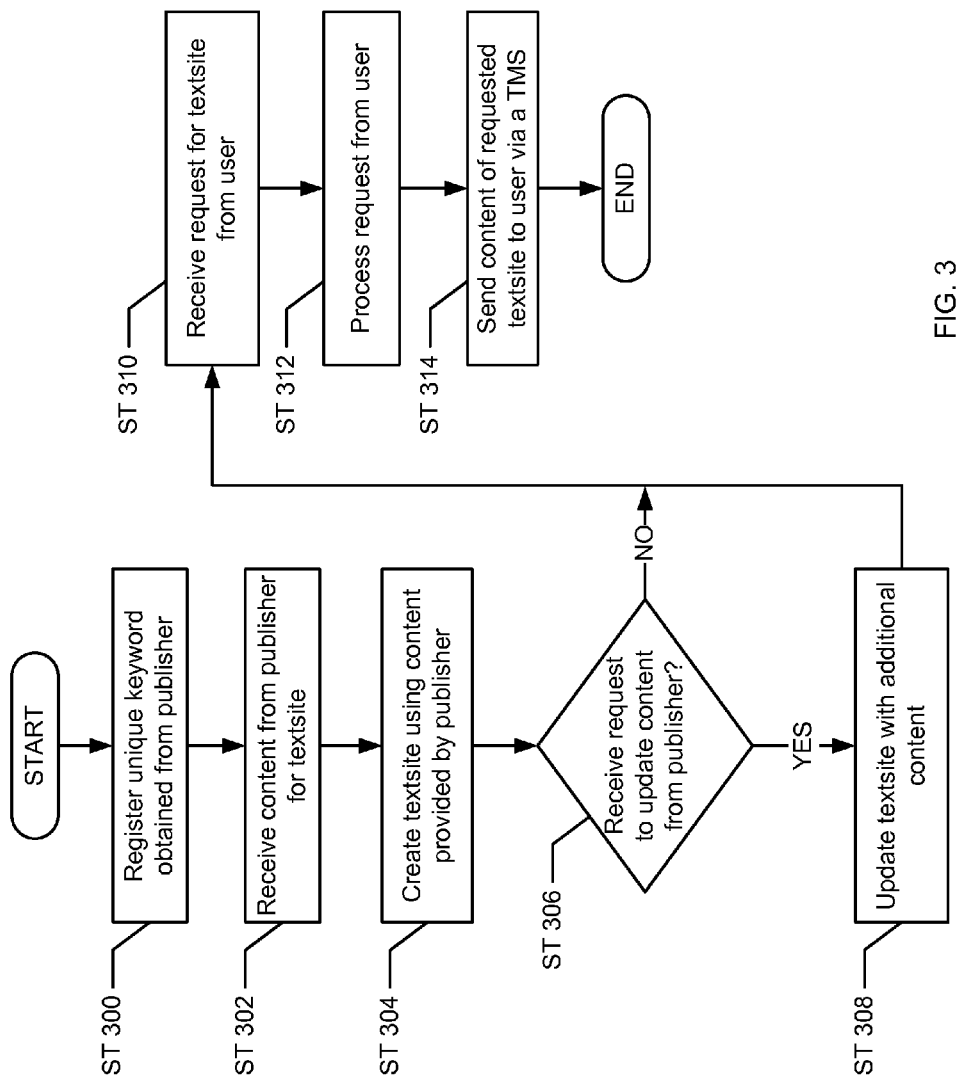
FIG. 3 shows a flow chart for providing access to content by a global textsite platform in accordance with one or more embodiments of the invention.

FIG. 3 shows a flow chart for accessing content of one or more textsites in accordance with one or more embodiments of the invention. More specifically, FIG. 3 shows a flow chart describing the process for accessing content from the global textsite platform perspective, in which the platform provides users (including both publishers and users accessing content authored by publishers) with access to content maintained in the form of textsites by the global textsite platform. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

Initially, the global textsite platform registers a unique keyword obtained form a publisher (ST 300). More specifically, in one or more embodiments of the invention, the global textsite platform receives a text message from a publisher mobile device, or receives input on the web interface of the platform from a publisher, with a request to register a keyword for a textsite. If the keyword is unique (i.e., if the keyword has not already been registered by another publisher or is not one of the reserved keywords for the text messaging protocol syntax), the global textsite platform registers the unique keyword as being associated with a new textsite and stores the keyword in the repository of the platform. To check whether the keyword registration request is for a unique keyword, the global textsite platform may compare the received keyword to the keywords already stored in the platform repository or search for any matching keywords that may already exist in the repository. To facilitate this, the repository may organize registered and reserved keywords in a searchable data structure and use mechanisms well known in the art to efficiently search the stored keywords. For example, the global textsite platform may organize the stored keywords in a hierarchical tree structure such as a binary tree, hash tables, and/or combinations thereof for searching the repository. Further, the global textsite platform may employ search algorithms such as tree search algorithms or hash algorithms to search the data structure of keywords.

In one or more embodiments of the invention, if the publisher sends a text message for registration of a keyword via a mobile device, the global textsite platform may link the created textsite to the phone number of the publisher's mobile device, and store this mapping in the platform repository. The global textsite platform may then be able to automatically know which textsite is being modified each time a text message is received from the same publisher mobile device.

Next, the global textsite platform receives content for the textsite from the publisher (ST 302). Using the content received from the publisher and the registered keyword, the global textsite platform creates a textsite on behalf of the publisher (ST 304). Those skilled in the art will appreciate that the global textsite platform may create an empty or default textsite without any content after successful registration of a unique keyword by a publisher. Specifically, in one or more embodiments of the invention, publishing tools provided by the global textsite platform may include a tool that creates a default or empty textsite upon registration of a unique keyword by a publisher. More specifically, the global textsite platform may provide a publisher with part of a hierarchical structure for a textsite, including an empty or minimal homepage and one or more sample text pages that may have a hierarchical relationship to the homepage of the textsite via standard navigating keywords. The sample text pages may be simple, static text pages. Alternatively, a textsite may be created after a first portion of content is received from a publisher.

Continuing with FIG. 3, at this stage, a determination is made as to whether the global textsite platform receives a request to update the content of the textsite from the publisher (ST 306). If a request to update a textsite is received, then the global textsite platform updates the textsite with additional content or removes older content to add the updated content provided by the publisher.

Alternatively, if no request for updating the textsite is received by the publisher, once a textsite is created and content for the textsite is authored by the publisher, the global textsite platform receives a request for access to the textsite from a user (ST 310). Specifically, the global textsite platform receives a text message via a TMS from a user mobile device, where the text message includes a request to access a particular textsite hosted by the platform. At this stage, the global textsite platform processes the request from the user mobile device (ST 312). In one or more embodiments of the invention, processing the request from the user mobile device may involve parsing the text message to determine the relevant keywords and text message protocol syntax that indicates the content that the user requests access to, and obtaining the content from the requested textsite for the user. In addition, processing the request from the user mobile device may include forwarding the text message to a third-party website and receiving a response from the third-party website with the content requested by the user. Finally, the global textsite platform sends the content of the requested textsite to the user via a TMS (ST 314). More specifically, the global textsite platform sends a response (in the form of a text message) to the text message received from the user's mobile device. The text message response includes the content requested by the user, e.g., the content of the homepage for a requested textsite, etc.

Those skilled in the art will appreciate that although not discussed in FIG. 3, the global textsite platform may also advertise its own semantics and syntax associated with the text messaging protocol to publishers and users. For example, the global textsite platform may advertise reserved keywords for creating a new textsite, registering a keyword, etc., and syntax such as the "!" sign representing syntax for a command to be performed by the global textsite platform and/or the ">" sign representing syntax for navigating to a text page of a textsite for a user.

Figure 4:
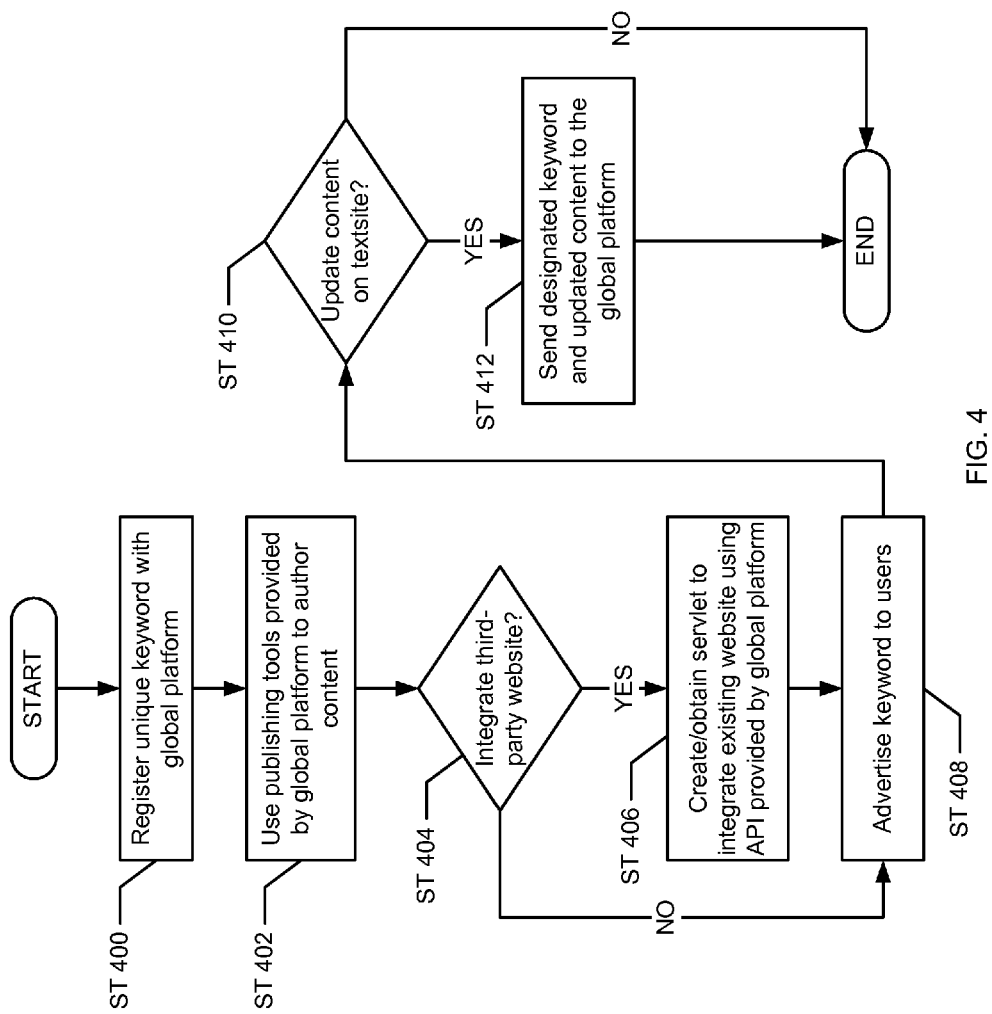
FIG. 4 shows a flow chart for publishing content using a global textsite platform in accordance with one or more embodiments of the invention.

FIG. 4 shows a flow chart for authoring content, by a publisher, for a textsite hosted by the global textsite platform in accordance with one or more embodiments of the invention. In one or more embodiments of the invention, one or more of the steps shown in FIG. 4 may be omitted, repeated, and/or performed in a different order than that shown in FIG. 4. Accordingly, the specific arrangement of steps shown in FIG. 4 should not be construed as limiting the scope of the invention.

Initially, a publisher registers a unique keyword with the global textsite platform (ST 400). In one or more embodiments of the invention, the request to register a unique keyword beings with the reserved keyword "register." More specifically, in one or more embodiments, the publisher sends a text message via a TMS to phone number or code associated with the global textsite platform. In one or more embodiments of the invention, the phone number or code may be a local number or a local code, corresponding to the geographic location of the publisher. Alternatively, the phone number or code may be a globally accessible number/code that is the same for all geographic locations.

Next, upon receiving a confirmation of the registered keyword, the publisher uses publishing tools provided by the global textsite platform to author content for the textsite associated with the registered keyword. Specifically, for example, the publisher may use the text messaging protocol of the global textsite platform to provide content for the homepage of the textsite and navigational keywords for text pages that may be linked to the homepage of the textsite. Further, the publisher may also provide content for each of the text pages linked to the homepage of the textsite. For example, a new textsite created for a restaurant may be associated with a unique keyword that is the name of the restaurant. The homepage of the textsite for the restaurant may have a welcome message and navigating keywords such as "Menu," "Location," and "Recipes." Each of the navigating keywords may be associated with a text page with additional information pertaining to the navigating keyword. All the content for the homepage and each linked text page are provided by the publisher. However, in one or more embodiments of the invention, the global textsite platform may publish advertisements on a textsite created on behalf of a publisher. Thus, for example, the global textsite platform may publish advertisement content provided by a second publisher on a textsite of a first publisher.

At this stage, a determination is made as to whether the publisher requests to integrate third-party website content with the authored content of the textsite (ST 404). If the publisher wishes to integrate third-party website content, then the publisher creates an adapter to integrate content from an existing website using an application programming interface (API) provided as a publishing tool by the global textsite platform. Specifically, the publisher provides the website URL to the global textsite platform, and creates a servlet (i.e., software code) for processing a user request to access the content of the textsite and responding to the user request with a formatted version of the content from the third-party website (ST 406). That is, the servlet is configured to take content from the third-party website and format the content (e.g., stripping the content to only the relevant text) to conform to text messaging protocol of the global textsite platform. Said another way, the servlet may perform screen scraping to obtain relevant content from a third-party website for incorporation into a textsite. In one or more embodiments of the invention, the servlet may reside on the web server hosting the third-party website from which content is integrated into the publisher's textsite. Alternatively, the servlet may reside on the global textsite platform.

If the publisher does not wish to integrate content from a third-party website with the textsite, then the process advances to ST 408, in which the publisher advertises the registered keyword to users. In one or more embodiments of the invention, the publisher may use the Print Flyer publishing tool provided by the global textsite platform to generate and print hard copies of flyers advertising the registered keyword for the publisher textsite. The flyers may be put up at various locations for advertising the publisher's registered keyword so that users obtain the keyword for accessing the textsite. Alternatively, publishers may advertise keywords by word-of-mouth, or by publishing the keyword on the Internet (e.g., on a blog or on a website associated with the publisher).

At this stage, a determination is made as to whether the publisher would like to update the content on the textsite (ST 410). In one or more embodiments of the invention, a request to update a textsite begins with the reserved keyword "update" and is followed by the keyword for the text page within a textsite that is to be updated with new content. The publisher then sends the new content for the updated textsite (ST 412). If no update to the content is desired, then the process ends.

Figure 5:
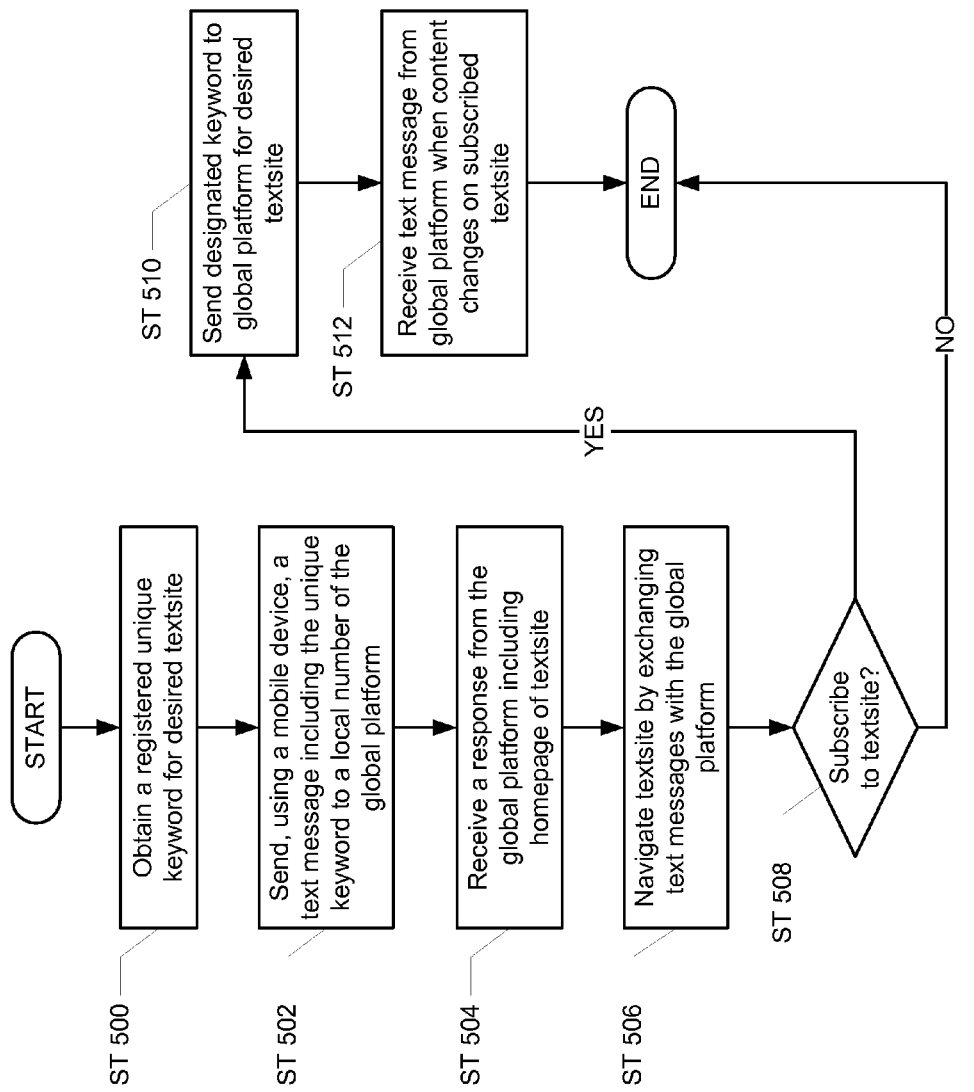
FIG. 5 shows a flow chart for using a global textsite platform in accordance with one or more embodiments of the invention.

FIG. 5 shows a flow chart for accessing content maintained by the global textsite platform by a user in accordance with one or more embodiments of the invention. In one or more embodiments of the invention, one or more of the steps shown in FIG. 5 may be omitted, repeated, and/or performed in a different order than that shown in FIG. 5. Accordingly, the specific arrangement of steps shown in FIG. 5 should not be construed as limiting the scope of the invention.

Initially, a user obtains a registered unique keyword for a desired textsite (ST 500). Specifically, in one or more embodiments of the invention, a user may obtain a registered unique keyword through an advertisement for the registered keyword. Upon obtaining the registered keyword for the desired textsite that the user wishes to browse or obtain information regarding, the user sends, using a mobile device, a text message including the unique keyword to a local number of the global textsite platform (ST 502). More specifically, the user sends a text message via a TMS, such as SMS or MMS, to a local number corresponding to a geographic location of the user. The text message includes the registered keyword for the desired textsite. Those skilled in the art will appreciate that the user may be in any global geographic location when requesting access to a textsite, as access to the platform is globally available to any user with TMS functionality on a mobile device.

Subsequently, the user receives a response from the global textsite platform including the homepage of the textsite that is associated with the registered unique keyword sent by the user (ST 504). At this stage, the user may communicate with the global textsite platform by exchanging a series of text messages and receiving text message responses to navigate the textsite (ST 506). Further detail on navigating textsites by a user, including examples of screen shots detailing what a user text message and a response from the global textsite platform may look like, may be found in copending related application with the application Ser. No. 12/728,169, the subject matter of which has been incorporated by reference above.

Continuing with FIG. 5, in one or more embodiments of the invention, a user, after navigating a desired textsite, may request to subscribe to the textsite (ST 508). If a user wishes to subscribe to a particular textsite, the user may send, in one or more embodiments of the invention, a text message including the reserved keyword "subscribe" followed by the registered keyword of the textsite, to the global textsite platform (ST 510). In this case, the user may receive a text message from the global textsite platform every time content on the subscribed textsite changes or is updated. This may be a desired feature, for example, for obtaining stock tips or performing day trading via a textsite. Alternatively, if the user does not wish to subscribe to the current textsite which the user is navigating, the process ends. Those skilled in the art will appreciate that a user may subscribe to a textsite at any time, with or without having navigating or browsed the textsite.

FIGS. 6-11 show various screen shots illustrating examples of accessing content hosted by a global textsite platform in one or more embodiments of the invention. Although FIGS. 6-11 show implementation examples of embodiments of the invention, those skilled in the art will appreciate that there may be other ways in which to implement embodiments of the invention, and that the example screen shots are not meant to limit the scope of the invention.

Figure 6A:
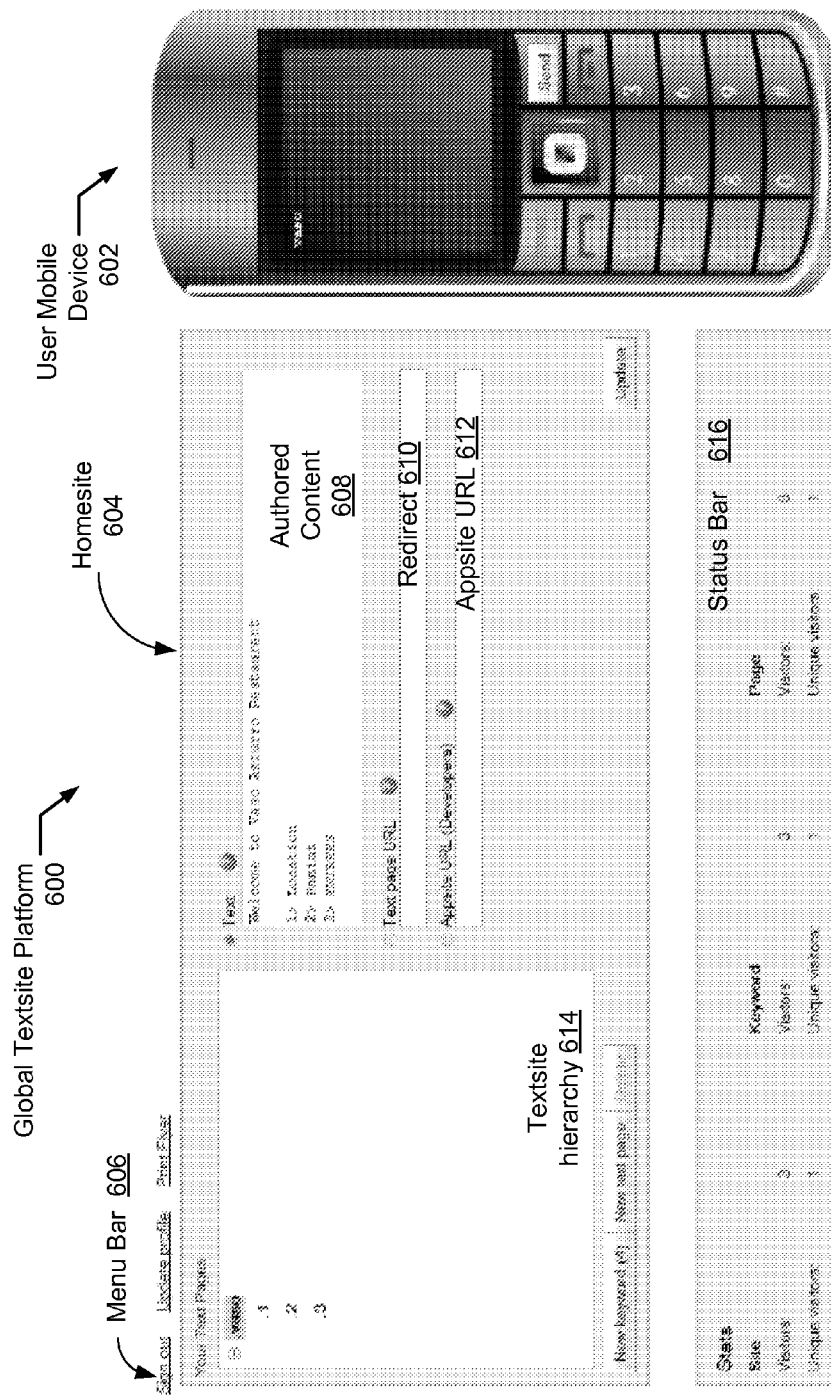
FIGS. 6-10 show screen shots of an exemplary global textsite platform in accordance with one or more embodiments of the invention.

FIG. 6A shows the global textsite platform (600) and a mobile device (602). The mobile device (602) may be a user mobile device. Generally, FIG. 6A shows the homesite (604) for the global textsite platform (600). The homesite (604) may be hosted by a service provider, such as an organization and/or a corporation that provides the global textsite platform as a service. In one or more embodiments of the invention, the homesite for the global textsite platform may be sent to a user when the user sends a text message to the global textsite platform number or code without any registered keywords included in the text message. In one or more embodiments of the invention, the homesite shown in FIG. 6A generally includes a menu bar (606), a text area for storing the authored content (608) received from a publisher, a text area for displaying a redirect (610) of a current textsite to the text page URL of another textsite, and a text area for displaying a third-party URL "appsite URL" (612) from which content is integrated into the current textsite, a textsite hierarchy (614) for displaying a plurality of textsites or a hierarchy of text pages associated with a single displayed textsite, and a status bar (616).

Figure 6B:
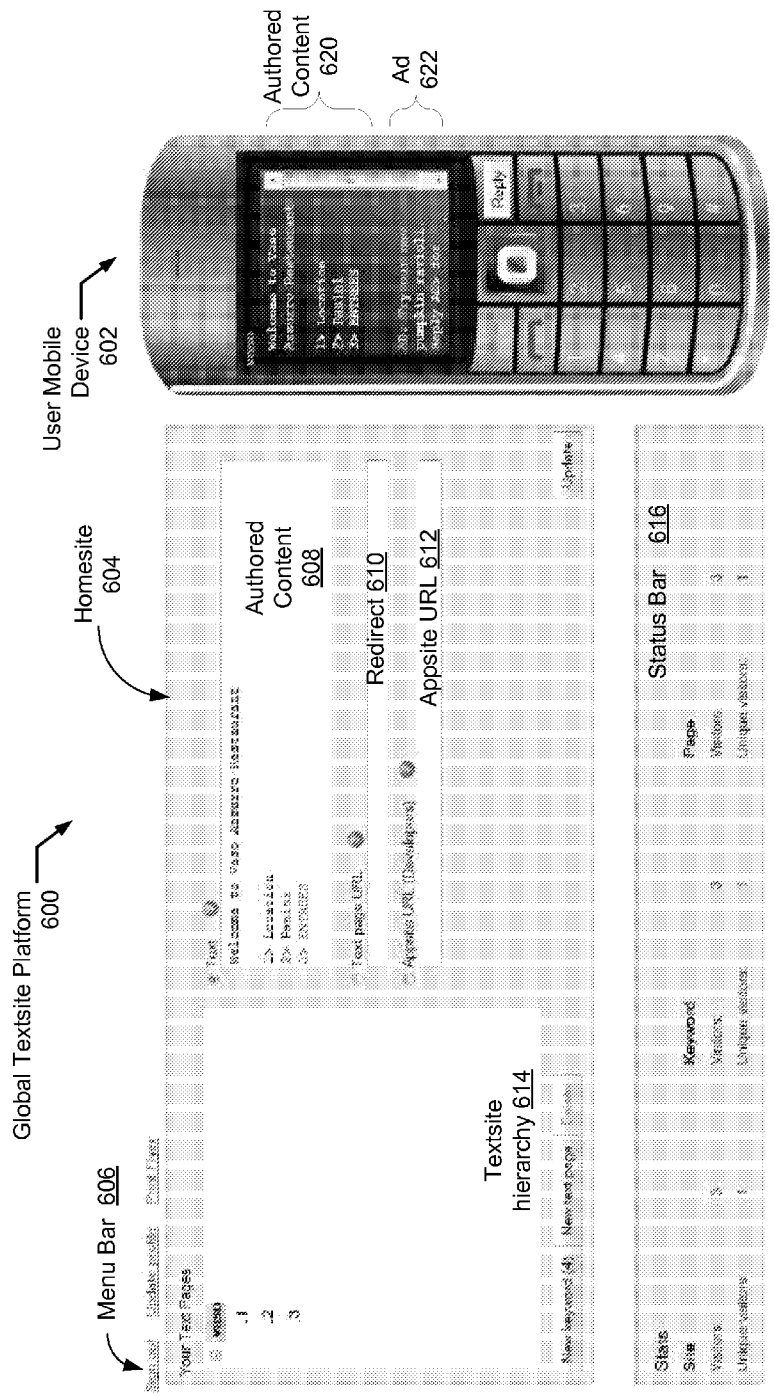
Figure 8:
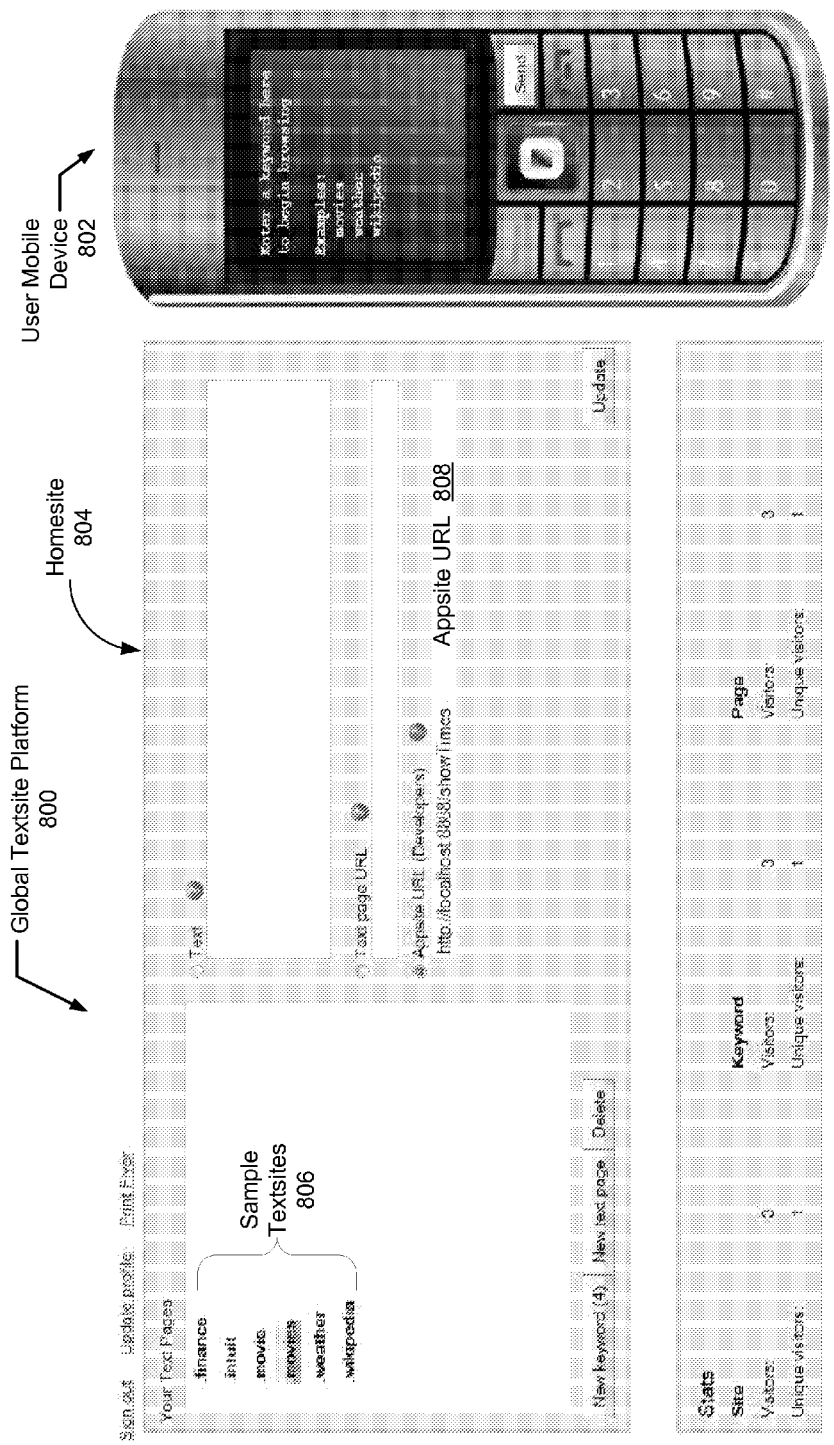

In one or more embodiments of the invention, a homesite (604) associated with the global textsite platform (600) may include sample textsites for user browsing (see FIG. 8, which shows a screen shot of the global textsite platform homesite with suggested sample textsites without displaying an example textsite, as is displayed in FIGS. 6A and 6B). For example, as shown in FIG. 6A, the menu bar (606) may include links to publishing tools, such as "print flyer", and profile options that may be selected/modified by a publisher such as such as "sign out," and "update profile." The status bar (616) may include status messages about a current textsite, such as the number of visitors to the textsite, to the text pages within the textsite, and the number of times the keyword registered to the textsite has been requested by a user.

Those skilled in the art will appreciate that the homesite for the global textsite platform is completely configurable by the service provider hosting the global textsite platform, and may include a variety of different menus, selection options, and may present content via text message exchanges in a variety of ways. Furthermore, the homesite for the global textsite may be static or dynamic. For example, the homesite may be static and display pre-designated keywords for browsing the global textsite platform, or may display dynamic information such as the current most popular textsites at a given point in time.

Turning to the specific example shown in FIG. 6A, the homesite (604) shown displays a textsite associated with the keyword "vaso." The authored content (608) area includes the content provided by the publisher for the homepage of the vaso textsite, including a welcome message (i.e., "Welcome to Vaso Azzurro Restaurant"), and three navigating keywords represented by numbers (i.e., "1", "2", and "3"), that a user browsing the textsite vaso is shown when the vaso homepage is retrieved for the user. Next to the number navigating keywords are identifiers or labels "Location", "Panini", and "Entrees", respectively. Those skilled in the art will appreciate that the labels may also be the navigating keywords, or a combination of either the number and/or the labels may serve as navigating keywords. The textsite hierarchy (614) area displays the hierarchy of the text pages corresponding to the "Location", "Panini", and "Entrees" navigating keywords. In one or more embodiments of the invention, the syntax ">" and "." are used by the global textsite platform (600) to manage the hierarchy of text pages for textsite vaso and response to a user text message with the correct text page requested. Specifically, the ">" sign is syntax used by the publisher to create text pages hierarchically linked to a textsite homepage. Further, the "." is used to delineate text pages of a textsite, similar to the "/" delineator for web pages of a website.

In FIG. 6A, an example is shown where the user sends a text message to a number associated with the global textsite platform (600) with the registered keyword "vaso" for browsing the textsite associated with the restaurant Vaso Azzurro. FIG. 6B shows an example of the response that the user would receive from the global textsite platform (600). Specifically, the user receives, in one or more embodiments of the invention, the authored content (620) for the textsite associated with registered keyword "vaso" (delineated by the "." mark) via a text message transmitted using a TMS. The text message received on the user's mobile device (602) includes all the information stored in the homesite of the textsite vaso, including the welcome message and the navigating keywords for browsing text pages associated with the textsite vaso.

In addition, in one or more embodiments of the invention, the global textsite platform (600) may publish an advertisement ("AD") for another textsite created by the same or a different publisher on the vaso textsite. This is similar to how a website includes ads for other websites that may be navigated to using a link that may be contained in the website ad. In the example shown in FIG. 6B, an advertisement "AD" (622) beginning with reserved keyword "AD" is sent to the user mobile device (602) as part of the homepage content for the vaso textsite. In the example of FIG. 6B, the ad (622) sent in the text message to the user mobile device (602) is for another restaurant serving pumpkin ravioli. A user may reply via text message with the keyword "AD" and be directed to the textsite associated with the restaurant whose advertisement appears on the vaso textsite.

Figure 7A:
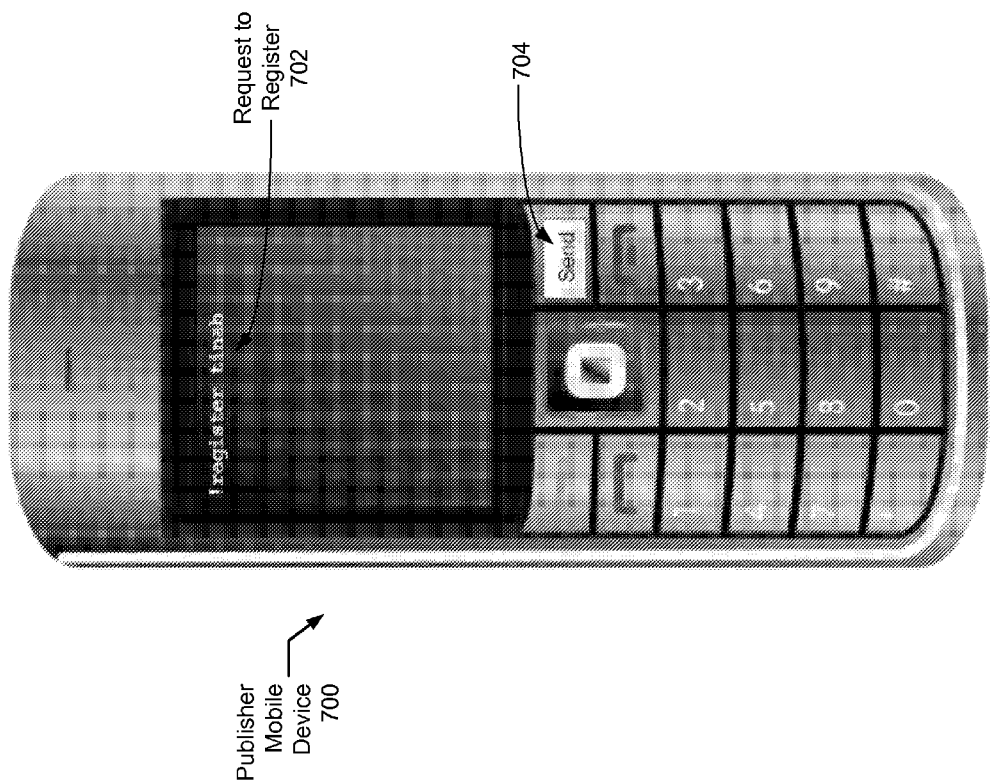
Figure 7B:
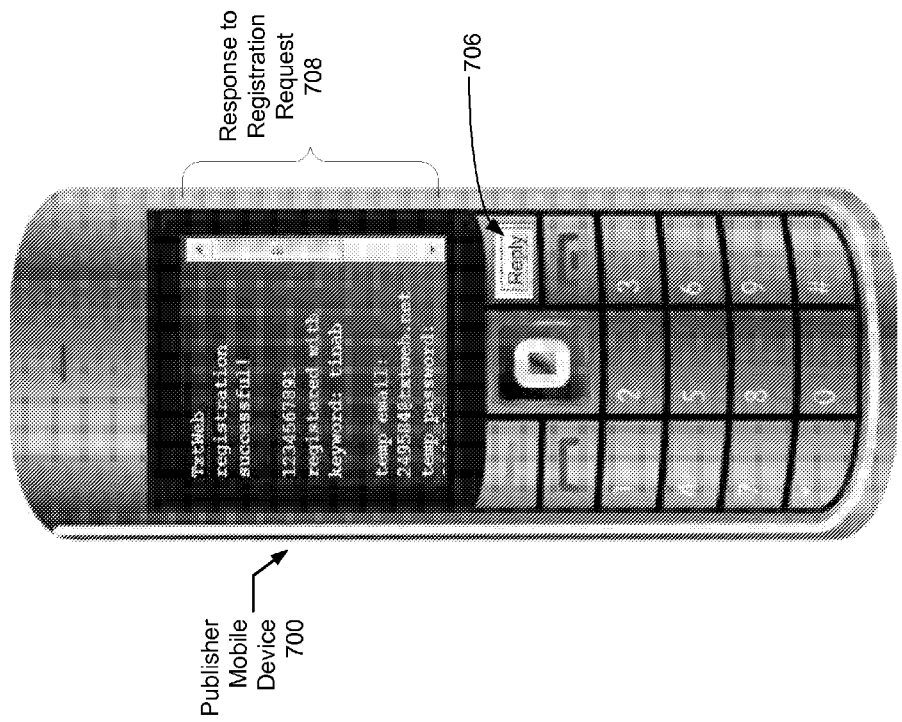

FIGS. 7A-7C show examples of a publisher registering a unique keyword and authoring content for a textsite created for the registered keyword, in accordance with one or more embodiments of the invention. In the examples shown in FIGS. 7A-7C, a publisher communicates with the global textsite platform using a mobile device and by exchanging text messages via a TMS. Specifically, FIG. 7A shows a publisher mobile device (700) with text message functionality. A publisher sends a text message (e.g., using the send button (704) on the publisher mobile device (700)) to a phone number or code associated with the global textsite platform with a request to register a new keyword (702). Specifically, in one or more embodiments, the request to register a new keyword (702) includes text message protocol syntax "!" and reserved keyword "register" followed by the unique keyword that the publisher desires for a new textsite. In the example of FIG. 7A, the publisher requests the global textsite platform to register the keyword "tinab." If this keyword is unique, based on the keywords already stored in the global textsite platform's repository, then the global textsite platforms responds to the publisher mobile phone via text message as shown in FIG. 7B. If the keyword chosen by the publisher is not unique, the global textsite platform may send a message that the registration was unsuccessful.

FIG. 7B shows a text message response (708) sent from the global textsite platform to a publisher mobile device (700) in response to a publisher request to register a new keyword for a textsite that is unique. In one or more embodiments of the invention, the response to registration request (708) is a text message from the global textsite platform stating that the registration with the global textsite platform was successful. The text message may further include information that the registered keyword is linked to the phone number of the publisher mobile device (700), and a temporary username and password for the publisher to use when logging onto the global textsite platform via the Internet. A publisher may reply to the text message response from the global textsite platform using the reply button (706) on the publisher mobile device (700).

FIG. 7C shows an example of a reply text message by the publisher for authoring content of the textsite associated with registered keyword "tinab." A publisher, using the publisher mobile device (700), sends a text message with syntax "!" and reserved keyword "update," followed by the text page of textsite "tinab" that is being authored or updated with content. Thus, for example, in FIG. 7C the publisher updates the homepage of textsite "tinab", delineated by the "." mark. The text message composed by the publisher then includes that the publisher authors (i.e., authored content (710)) for the homepage of textsite "tinab." In one or more embodiments of the invention, the content also includes the links to the text pages (delineated by the ">" mark) for the textsite, which the global textsite platform hierarchically links to the homepage ".tinab."

FIG. 8 shows a screen shot for a homesite (804) of the global textsite platform (800) that includes an example of integrating content from third-party websites with a textsite in accordance with one or more embodiments of the invention. Specifically, FIG. 8 shows a global textsite platform homesite (804) with various sample textsites (806) that may be requested by a user mobile device (802) via a TMS. The user mobile device (802) displays a text message that may be received from the global textsite platform when the user requests access to homesite of the global textsite platform (e.g., sending a text message to the number/code of the global textsite platform without any specific keywords associated with a textsite).

In one or more embodiments of the invention, a publisher may integrate existing website content or existing textsite content with the publisher's textsite. For example, a publisher may provide the global textsite platform with an appsite URL from which the publisher wishes to integrate content, and generate a servlet for receiving a request for content from the third-party website from the global textsite platform (800), parsing the content of the third-party website, and responding to the global textsite platform with relevant text from the third-party website. In this scenario, the global textsite platform stores the apposite URL linked to the publisher textsite, and forwards a user text message to the servlet resident on the third-party website and forwards the received response from the servlet to the user mobile device via a TMS.

Alternatively, in one or more embodiments of the invention, the global textsite platform may integrate content from existing websites for reserved keyword services provided by the global textsite platform. For example, some sample textsites provided by the global textsite platform may include textsites for weather information, movie show times, a textsite for the service provider (e.g., an entity such as a corporation) hosting the global textsite platform, etc.

In either of the two cases described above, the global textsite platform provides an application programming interface (API) for publishers or the service provider of the global textsite platform itself to integrate content from third-party websites. Publishers and/or the service provider may create adapters for parsing and formatting the relevant content from the third-party website so that the content is easily provided via a TMS to a user mobile device.

Turning to the specific example of FIG. 8, the global textsite platform has integrated content from a third-party website for textsite ".movies". Specifically, in one or more embodiments of the invention, the textsite ".movies" represented by reserved keyword "movies" integrates content from the appsite URL (808) http://localhost:8888/showTimes. Consider the scenario in which a user responds to the text message with the global textsite platform homepage, as shown in FIG. 8, by sending a text message with keyword "movies," followed by the name of a movie or a specific movie theater name, using the user mobile device (802). Because the textsite for keyword "movies" integrates content from an existing third-party website, the global textsite platform (800) may forward the request to a servlet resident on the appsite URL included in text box (808). The servlet then parses the content of the appsite URL and returns movie show times to the global textsite platform, which then forward the movie show times received from the third-party website URL to the user mobile phone (802) via a TMS.

Figure 9:
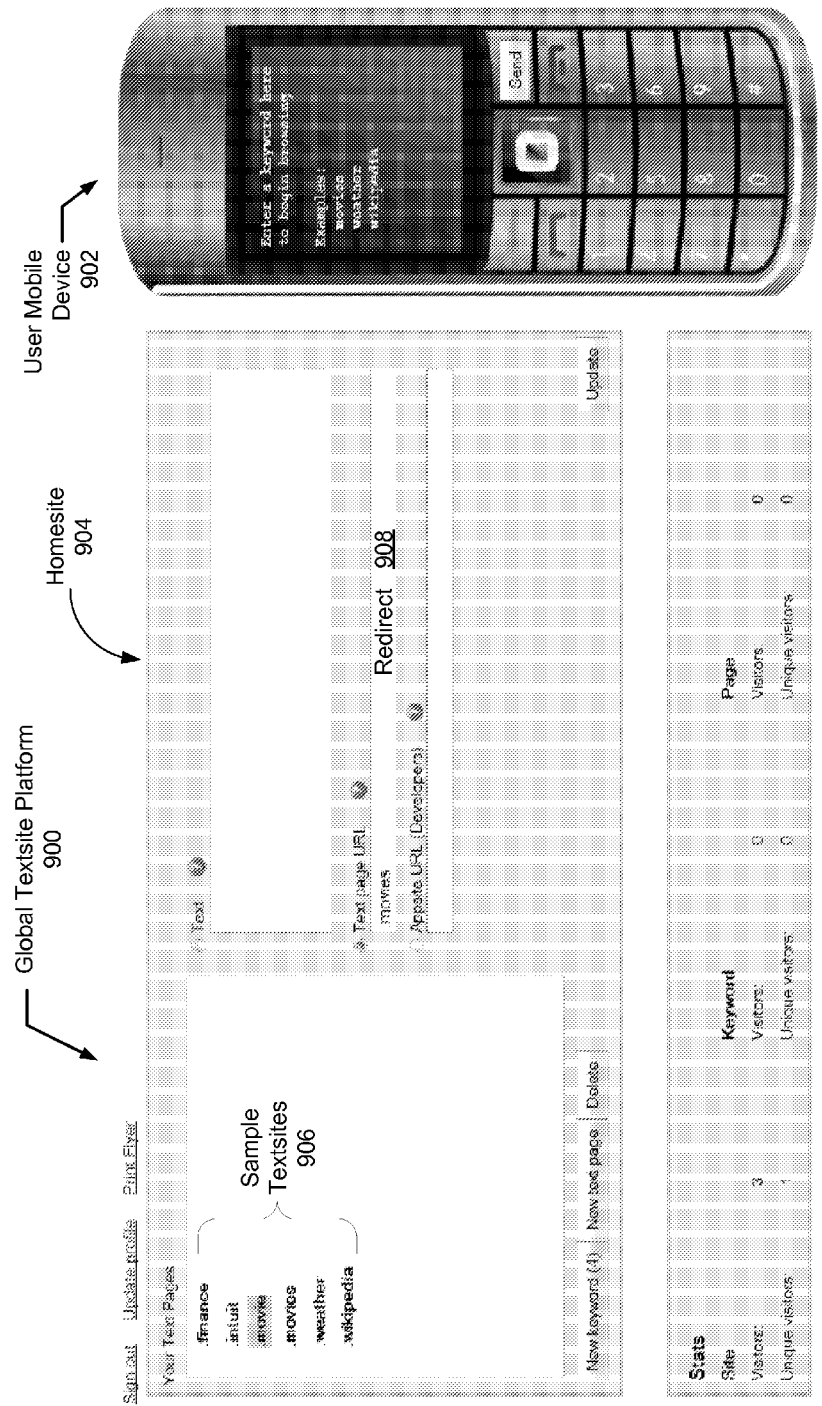

FIG. 9 shows an example of using the global textsite platform homesite (904) to redirect a request for content from a textsite to another textsite. Specifically, a redirect (908) area is for inserting a textsite to which a current textsite is redirected. In FIG. 9, for example, a request for a textsite with keyword "movie" is redirected to the textsite for keyword "movies." Accordingly, in the example of FIG. 9, when a user sends a text message including either of the singular term "movie" or the plural term "movies," the same textsite homepage, with content pulled from the appsite URL for movie show times, is sent to the user mobile device (902).

Figure 10:
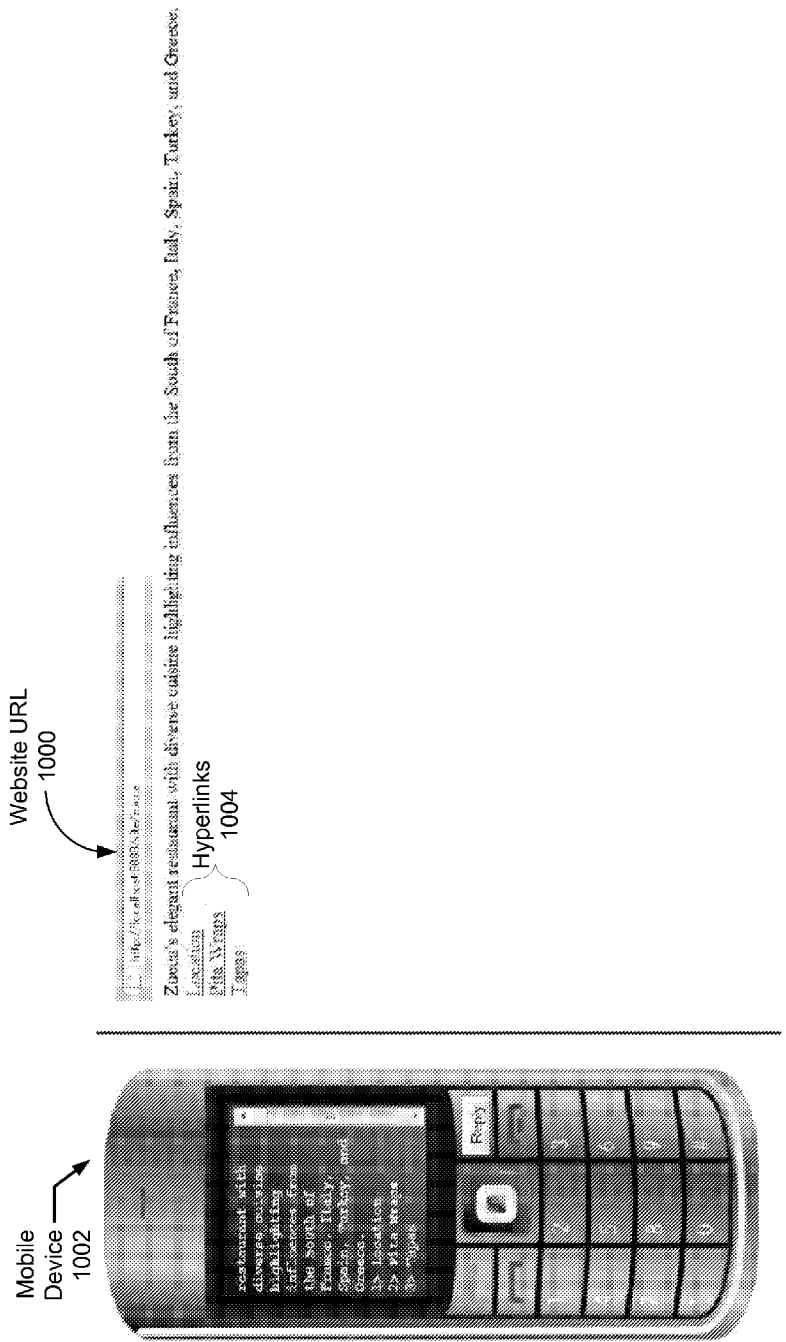

FIG. 10 shows a screen shot of a textsite converted to a website in accordance with one or more embodiments of the invention. In one or more embodiments of the invention, the global textsite platform includes functionality to automatically publish authored content for textsite as a website that may be accessed via the Internet. That is, the global textsite platform includes functionality (e.g., software code) to convert a textsite to a website. More specifically, in one or more embodiments of the invention, the global textsite platform converts a textsite keyword to a website URL, with each navigating keyword or label/identifier in a textsite hierarchy being displayed as a hyperlink on the website URL homepage. As a result, a user browsing the textsite via a TMS may, when access to the Internet becomes available to the user mobile device or when the user obtains access to a computer system connected to the Internet, may browse the same textsite in the form of a website. Alternatively, the website conversion service may be useful for a publisher to view authored content on a larger display area using a computer system connected to the Internet rather than a mobile device.

In the specific example of FIG. 10, the textsite for restaurant "Zucca" registered with keyword "zucca" is converted to a website URL (1000) in the form of http://localhost:8888/site/zucca. The textsite home page for restaurant "Zucca" is shown in the mobile device (1002). The same content shown in the mobile device (1002) is also shown in the website homepage (1000). That is, the homepage of the textsite for Zucca is converted to a homepage of the website URL, with each navigating keyword for text pages of textsite ".zucca" (e.g., numbers 1, 2, and 3 (not shown)) or label/identifier such as Location, Pita Wraps, and Tapas being converted to hyperlinks (1004) that may be selected for viewing the same content authored by the publisher for each text page.

Embodiments of the invention provide a globally accessible platform that provides access to content via a TMS to mobile device users that may not subscribe to a data plan for obtaining information via web browsing or by connecting to the Internet. Accordingly, an end user browsing textsites hosted by the global textsite platform is not required to log into a web interface or downloading any data when using textsites to obtain information. Specifically, embodiments of the invention provide global textsite platform for creating, maintaining, and providing access to textsites created by the global textsite platform or by publishers/developers/service providers of content. The global textsite platform is globally accessible by publishers/developers/service providers authoring content, and by users browsing the content on textsites, in any geographic location. For example, a local resident in a village in India, or another emerging country, who does not subscribe to a data plan but uses a mobile device to text/make phone calls may query the global textsite server for local restaurants in the village or obtain information about local showtimes for a movie in a nearby theater, all via a TMS by exchanging text messages with the global textsite platform. Similarly, on the publisher side, the owner of the restaurant can advertise the unique registered keyword for their restaurant and provide information about the food served or the location and hours of the restaurant to local residents without the residents requiring any Internet connection or data plan on their mobile device.

Further, in one or more embodiments of the invention, a service provider of the global textsite platform (e.g., corporation or entity hosting the global textsite platform) may monetize on the access to content provided by charging for placement of advertisements on textsites, charging for premium transactions performed using the textsite (such as purchasing movie tickets using a textsite), charging a subscription fee for subscribing to textsites, commercializing keyword registration, or monetizing on services offered in any other suitable manner.

The invention may be implemented on virtually any type of computer regardless of the platform being used. For example, as shown in FIG. 11, a networked computer system (1100) includes a processor (1102), associated memory (1104), a storage device (1106), and numerous other elements and functionalities typical of today's computers (not shown). The networked computer (1100) may also include input means, such as a keyboard (1108) and a mouse (1110), and output means, such as a monitor (1112). The networked computer system (1100) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer (1100) may be located at a remote location and connected to the other elements over a network.

Further, the invention may be implemented on a distributed system having a plurality of nodes, where each portion of the invention may be located on a different node within the distributed system. In one or more embodiments of the invention, the node corresponds to a computer system. Alternatively, the node may correspond to a processor with associated physical memory.

In one or more embodiments of the invention, software instructions to perform embodiments of the invention, when executed by a processor, may be stored on a tangible computer readable medium such as a compact disc (CD), a diskette, a tape, or any other tangible computer readable storage device. Further, one or more embodiments of the invention may be implemented as an Application Program Interface (API) executing on a computer system(s), where the API includes one or more software instructions.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing content comprising:
registering a unique keyword;
creating, on behalf of a mobile publisher and based on content received, a textsite associated with the unique keyword, wherein creating the textsite comprises:
creating a homepage associated with the textsite,
associating a hierarchy of text pages with the homepage,
associating each of the hierarchy of text pages with a navigating keyword, wherein the homepage comprises the navigating keyword of at least one text page in the hierarchy of text pages,
mapping the navigating keyword to a link of a website, and
converting a webpage of the website indexed by the link to the at least one text page associated with the navigating keyword;
receiving, from a user, a first request to access the textsite;
processing the first request from the user; and
providing access to the textsite by sending the homepage of the textsite, via a text messaging service (TMS), to a user mobile device.

2. The method of claim 1, wherein the content of the textsite is globally accessible by a plurality of users via the TMS.

3. The method of claim 1, further comprising:
requesting to register the unique keyword with a global textsite platform,
authoring the content associated with the registered unique keyword using publishing tools provided by the global textsite platform, and
updating the textsite associated with the registered unique keyword, wherein the textsite comprises the content.

4. The method of claim 3, further comprising:
receiving a second request to generate a flyer advertising the registered unique keyword;
generating the flyer comprising an advertisement for the registered unique keyword, wherein content for the flyer is obtained from the authored content; and
sending the flyer, via the TMS, to a computing device accessible by the mobile publisher.

5. The method of claim 3, further comprising:
obtaining the registered unique keyword associated with the textsite,
sending, via the TMS, a second request for access to the textsite, wherein the second request comprises the registered unique keyword and wherein the request is in the form of a text message sent using the user mobile device, and
receiving, via the TMS, a response to the text message on the user mobile device, wherein the response comprises content associated with the homepage of the textsite.

6. The method of claim 1, further comprising:
receiving a second request, from the user mobile device, to access a homesite of the global textsite platform, wherein the second request is a first text message sent to a phone number of the global textsite platform; and
sending, to the user mobile device in response to the second request, a second text message comprising content of the homesite.

7. The method of claim 6, wherein the global textsite platform is configured to automatically convert the textsite into a website accessible using a network connection.

8. The method of claim 6, wherein the homesite of the global textsite platform comprises a plurality of suggested textsite keywords for browsing by the user.

9. The method of claim 1, further comprising:
receiving the content from the mobile publisher, wherein receiving the content from the mobile publisher comprises:
receiving a second request to integrate content from a third-party website with the textsite using an application program interface (API) provided by a global textsite platform.

10. The method of claim 9, further comprising:
forwarding a query received, via the TMS, from the user mobile device to a servlet resident on the third-party website,
receiving a response to the query from the third-party website, and
forwarding the response to the user mobile device via the TMS.

11. The method of claim 1, wherein processing the first request for the textsite from the user comprises:
parsing the first request to determine a registered unique keyword sent by the user and relevant portions of the first request, and
obtaining the content from the requested textsite.

12. The method of claim 1, further comprising:
receiving updated content for the textsite; and
updating the textsite on behalf of the publisher with the updated content.

13. The method of claim 1, further comprising:
receiving a second request, via the TMS, to subscribe to the textsite; and
subscribing the user to the textsite, wherein a subscribed user automatically receives a text message when content is updated on the textsite.

14. The method of claim 1, wherein registering the unique keyword comprises:
comparing the unique keyword to a plurality of keywords stored in a searchable data structure; and
when a match is not found, sending a message to the publisher indicating that the registration of the unique keyword is successful.

15. The method of claim 1, wherein the TMS is short messaging service (SMS).

16. The method of claim 6, wherein the global textsite platform is associated with a local number in each of a plurality of geographic regions.

17. The method of claim 6, wherein the registered unique keyword is stored in a searchable data structure within the global textsite platform.

18. The method of claim 6, wherein the global textsite platform is configured to automatically convert the textsite into the website accessible using an Internet connection.

19. A method for publishing content, comprising:
registering, by a mobile publisher, a unique keyword with a global textsite platform by communicating with the global textsite platform using a text messaging service (TMS);
authoring content associated with the registered unique keyword using publishing tools provided by the global textsite platform, wherein the authoring comprises:
creating a textsite associated with the registered unique keyword;
creating a homepage associated with the textsite;
associating a hierarchy of text pages with the homepage;
associating each of the hierarchy of text pages with a navigating keyword;
sending, to the global textsite platform using the TMS, the hierarchy of text pages and a specification of the homepage associated with the textsite,
wherein the homepage comprises the navigating keyword of at least one text page in the hierarchy of text pages;
mapping the navigating keyword to a link of a website; and
converting a webpage of the website indexed by the link to the at least one text page associated with the navigating keyword.

20. The method of claim 19, wherein the mobile publisher registers the unique keyword and authors content for the textsite using a mobile device to exchange text messages with the global textsite platform via the TMS.

21. The method of claim 19, wherein registering the unique keyword comprises sending a text message comprising a request to register the unique keyword to the global textsite platform, wherein the request comprises syntax specific to a text messaging protocol of the global textsite platform.

22. The method of claim 19, further comprising:
updating the textsite with additional content, by sending the additional content to the global textsite platform, via the TMS, using syntax specific to a text messaging protocol of the global textsite platform.

23. The method of claim 19, further comprising:
advertising the registered unique keyword to a plurality of users of the global textsite platform.

24. The method of claim 23, wherein the plurality of users, each using a mobile device, sends the advertised unique keyword in a text message to the global textsite platform to obtain the content of the textsite associated with the unique keyword.

25. The method of claim 19, wherein authoring the content comprises:
integrating content from a third-party website with the textsite using an application programming interface (API) provided by the global textsite platform.

26. The method of claim 25, wherein the integrating comprises:
creating a servlet resident on the third-party website, wherein the servlet is configured with functionality to:
receive a query from the global textsite platform for content from the third-party website,
parse and format the content relevant to the query from the third-party website, and
respond to the query with the formatted relevant content.

27. A method for accessing content, comprising:
obtaining a registered unique keyword associated with a desired textsite;
sending, via a text messaging service (TMS) using a user mobile device, a first text message comprising the registered unique keyword to a global textsite platform;
receiving a first text message response, via the TMS, comprising a homepage of the textsite;
sending, via the TMS using the user mobile device, a second text message comprising a navigating keyword included in the homepage; and
receiving a second text message response, via the TMS, comprising a text page of the textsite,
wherein the textsite is created by:
associating a hierarchy of text pages with the homepage,
associating at least the text page of the hierarchy of text pages with the navigating keyword,
mapping the navigating keyword to a link of a website, and converting a webpage of the website indexed by the link to the text page associated with the navigating keyword.

28. The method of claim 27, further comprising:
navigating the textsite by exchanging a plurality of text messages, via the TMS, with the global textsite platform.

29. The method of claim 27, further comprising:
sending, via the TMS, a request to subscribe to the textsite associated with the registered unique keyword; and
receiving, via the TMS, updated content of the textsite each time the textsite is modified.

30. The method of claim 27, wherein the user mobile device is not subscribed to a data plan for browsing an Internet connection on the mobile device.

31. The method of claim 27, wherein the TMS is short messaging service (SMS).

32. A non-transitory computer readable storage medium comprising software instructions for providing access to content, that when executed, comprise functionality to:
register a unique keyword received;
create, on behalf of a mobile publisher and based on content received, a textsite associated with the unique keyword, wherein creating the textsite comprises:
creating a homepage associated with the textsite,
associating a hierarchy of text pages with the homepage,
associating each of the hierarchy of text pages with a navigating keyword, wherein the homepage comprises the navigating keyword of at least one text page in the hierarchy of text pages,
mapping the navigating keyword to a link of a website, and
converting a webpage of the website indexed by the link to the at least one text page associated with the navigating keyword;
receive, from a user, a first request to access the textsite;
process the first request from the user; and
provide access to the textsite by sending the homepage, via a text messaging service (TMS), to a user mobile device.

33. The non-transitory computer readable storage medium of claim 32, wherein the content of the textsite is globally accessible by a plurality of users via the TMS.

34. The non-transitory computer readable storage medium of claim 32, wherein the software instructions that when executed, further comprise functionality to:
request to register the unique keyword with a global textsite platform,
author content associated with the registered unique keyword using publishing tools provided by the global textsite platform, and
update the textsite associated with the registered unique keyword, wherein the textsite comprises the authored content.

35. The non-transitory computer readable storage medium of claim 34, wherein the software instructions that when executed, further comprise functionality to:
receive a second request to generate a flyer advertising the registered unique keyword;
generate the flyer comprising an advertisement for the registered unique keyword, wherein content for the flyer is obtained from the authored content; and
send the flyer, via the TMS, to a computing device accessible by the mobile publisher.

36. The non-transitory computer readable storage medium of claim 32, wherein the user is configured to:
obtain the registered unique keyword associated with the textsite,
send, via the TMS, a second request for access to the textsite, wherein the second request comprises the registered unique keyword, and wherein the second request is in the form of a text message sent using the user mobile device, and
receive, via the TMS, a response to the text message on the user mobile device, wherein the response comprises content associated with the homepage of the textsite.

37. The non-transitory computer readable storage medium of claim 34, further comprising:
receiving a second request, from the user mobile device, to access a homesite of the global textsite platform, wherein the second request is a first text message sent to a phone number of the global textsite platform; and
sending, to the user mobile device in response to the second request, a second text message comprising content of the homesite.

38. The non-transitory computer readable storage medium of claim 37, wherein the homesite of the global textsite platform comprises a plurality of suggested textsite keywords for browsing by the user.

39. A system for providing content, comprising:
a repository configured to store a unique keyword that is registered with a global textsite platform;
a plurality of publishing tools provided by the global textsite platform, wherein the plurality of publishing tools are used by a mobile publisher to author content associated with the registered unique keyword, wherein the plurality of publishing tools are configured to:
create a textsite associated with the registered unique keyword,
create a homepage associated with the textsite,
associate a hierarchy of text pages with the homepage,
associate each of the hierarchy of text pages with a navigating keyword,
receive, from the mobile publisher using a text messaging service (TMS) the hierarchy of text pages and a specification of the homepage associated with the textsite, wherein the homepage comprises the navigating keyword of at least one text page in the hierarchy of text pages,
map the navigating keyword to a link of a website, and
convert a webpage of the website indexed by the link to the at least one text page associated with the navigating keyword;
an agent located within the global textsite platform and configured to receive a request to access the textsite from a user mobile device, and send a response comprising the homepage to the user mobile device via TMS; and
a server comprising a processor and configured to host the textsite.

40. The system of claim 39, wherein the registered unique keyword is stored in a searchable data structure.

41. The system of claim 39, wherein the textsite comprises the homepage and the hierarchy of text pages, wherein the homepage and the hierarchy of text page are configured to be navigated via the TMS.

42. The system of claim 39, wherein the text messaging service is short messaging service (SMS).

43. The system of claim 39, wherein the plurality of publishing tools comprise a text messaging protocol for authoring content and for navigating the textsite.

44. The system of claim 43, wherein the repository is further configured to store pre-designated keywords corresponding to the text messaging protocol.

45. The system of claim 39, wherein the plurality of publishing tools comprise a web-based content authoring tool accessible via an Internet connection.

46. The system of claim 39, wherein the plurality of publishing tools comprise an application programming interface (API) for integrating content from a third-party website with at least one of the plurality of textsites.

47. The system of claim 39, wherein the plurality of publishing tools comprise a flyer printing tool that uses the content to create a printable flyer for advertising the registered unique keyword.

48. The system of claim 39, wherein the textsite is globally accessible via the TMS.

49. The system of claim 39, wherein the mobile publisher authors content for the textsite using a mobile device to communicate with the global textsite platform via the TMS.

* * * * *